(12) United States Patent
Young (10) Patent No.: US 7,617,267 B1
(45) Date of Patent: Nov. 10, 2009

(54) CONFIGURABLE MULTI-TAP FILTER

(75) Inventor: Wayne D. Young, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 855 days.

(21) Appl. No.: 11/201,563

(22) Filed: Aug. 10, 2005

(51) Int. Cl.
*G06F 17/10* (2006.01)

(52) U.S. Cl. .................................... 708/300

(58) Field of Classification Search ........................ None
See application file for complete search history.

(56) References Cited

U.S. PATENT DOCUMENTS

| | | | | |
|---|---|---|---|---|
| 5,600,582 | A * | 2/1997 | Miyaguchi | 708/300 |
| 6,411,647 | B1 * | 6/2002 | Chan | 375/216 |
| 2004/0170223 | A1 * | 9/2004 | Chiueh et al. | 375/229 |
| 2006/0031274 | A1 * | 2/2006 | Haddadin et al. | 708/300 |
| 2006/0085496 | A1 * | 4/2006 | Bacche et al. | 708/300 |

* cited by examiner

*Primary Examiner*—David H Malzahn
(74) *Attorney, Agent, or Firm*—Patterson & Sheridan, LLP (57) ABSTRACT

One embodiment of a configurable multi-tap filter includes a parallel-to-serial formatter configured to transform a pixel stream into a first component pixel stream and a second component pixel stream, a configurable memory that includes a first channel and a second channel, wherein pixels from the first component pixel stream are stored in the first channel and pixels from the second component pixel stream are stored in the second channel, and a multi-tap filter configured to process a component of a pixel from the first channel and a like component of a pixel from the second channel. In various embodiments, the configurable multi-tap filter may be implemented as a two-tap, three-tap or five-tap filter and may be used to process either RGB or YUV pixels streams. One advantage of the disclosed configurable multi-tap filter is that it uses memory more efficiently than prior art filters.

20 Claims, 10 Drawing Sheets

CONFIGURABLE MULTI-TAP FILTER

BACKGROUND OF THE INVENTION

1. Field of the Invention

Embodiments of the present invention relate generally to image processing and more specifically to a configurable multi-tap filter.

2. Description of the Related Art

Vertical scaling is used in image processing to increase or reduce the number of vertical lines from a source image to a destination image. In such a process, a source image is scaled by a scaling factor. For example, a one-half size destination image is achieved by multiplying the source image by a scaling factor of 0.5.

Vertical filtering is used to reduce undesired artifacts, such as aliasing, that result from vertical scaling. Typically, a source image is filtered by a vertical filter prior to vertical scaling. A vertical filter uses two or more source image lines to generate a filtered image. Each source image line is processed within a stage of the vertical filter. Each stage of the vertical filter is commonly referred to as a "tap." For example, a vertical filter that uses two source image lines is referred to a two-tap vertical filter. Generally, different scaling factors require different types of vertical filters. For example, a relatively small scaling factor may require a five-tap vertical filter, while a relatively large scaling factor may require a two-tap vertical filter.

Each source image line for the vertical filter is stored in a line store. Typically, line stores are implemented with random access memory (RAM), and the length of the line store corresponds to the longest source image line that is processed by the vertical filter.

A configurable vertical scaler is a vertical scaler that can scale a source image by more than one scaling factor. A configurable vertical scaler has the advantage of reducing the number of discrete vertical scalers required for a given system. The configurable vertical scaler may require a configurable vertical filter. For example, if the configurable vertical scaler is able to scale a source image by a range of scaling factors that require both a two-tap and a three-tap vertical filter, then the configurable vertical filter can be used to provide the functionality of both of these vertical filters.

Figure 1A:
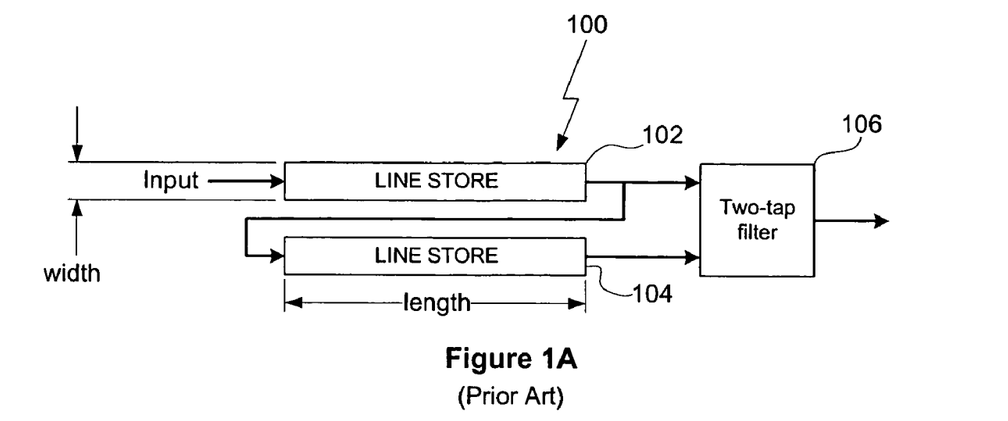
FIG. 1A is a conceptual diagram of a two-tap vertical filter, according to the prior art.

Configurable vertical filters require a configurable set of line stores. However, existing configurable line stores have relatively inefficient RAM usage, especially in certain configurations. To understand the drawbacks of the current art, consider a two-tap, a three-tap and a five-tap vertical filter. FIG. 1A is a conceptual diagram of a two-tap vertical filter 100, according to the prior art. The two-tap vertical filter 100 includes a first line store 102, a second line store 104 and a two-tap filter 106. The two-tap filter 106 may be any two-tap filter that provides a desired frequency response. The source image pixels are input into the first line store 102. The output of the first line store 102 is coupled to the two-tap filter 106 and to the input of the second line store 104. The output of the second line store 104 is coupled to the two-tap vertical filter 106. Each source image line required by the two-tap filter 106 is stored in the line stores 102 and 104. The length of the line store corresponds to the longest source image line that is processed by the two-tap vertical filter 100. Furthermore, the width of the line store must be wide enough to support the width of the pixels of the source image line.

Figure 1B:
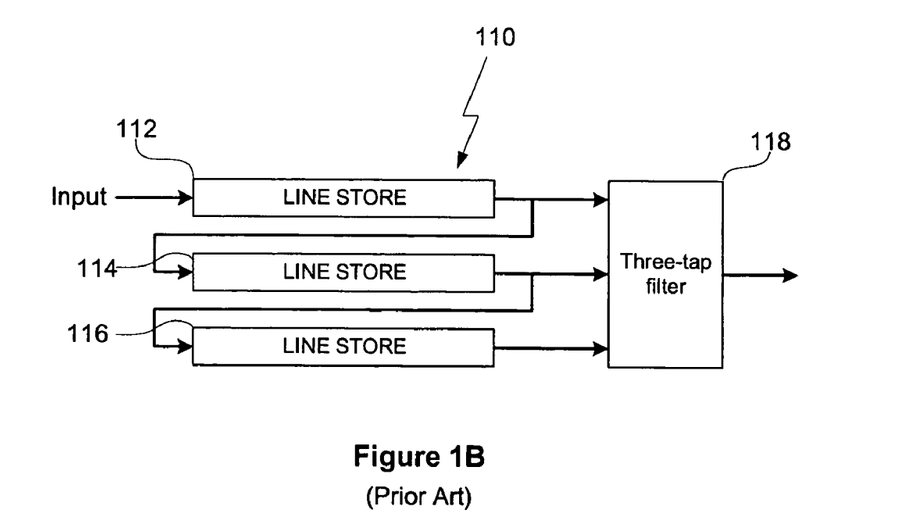
FIG. 1B is a conceptual diagram of a three-tap vertical filter, according to the prior art.

FIG. 1B is a conceptual diagram of a three-tap vertical filter 110, according to the prior art. The three-tap vertical filter 110 includes a first line store 112, a second line store 114, a third line store 116 and a three-tap filter 118. The three-tap filter 118 may be any three-tap filter that provides a desired frequency response. The source image pixels are input into the first line store 112. The output of the first line store 112 is coupled to the three-tap filter 118 and to the input of the second line store 114. The output of the second line store 114 is coupled to the three-tap vertical filter 116 and the input of the third line store 116. The output of the third line store 116 is coupled to the three-tap filter 118. As in the case of the two-tap vertical filter 100, each source image line required by the three-tap filter 118 is stored in the line stores 112, 114, and 116. Further, the length and width requirements of the line stores described above in connection with the two-tap vertical filter 100 apply with equal force to the three-tap vertical filter 110.

Figure 1C:
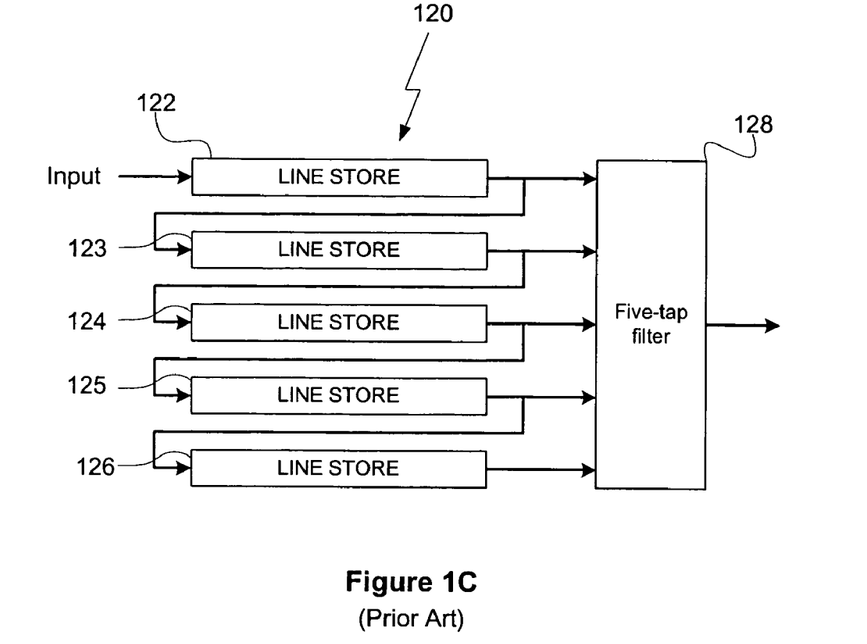
FIG. 1C is a conceptual diagram of a five-tap vertical filter, according to the prior art.

FIG. 1C is a conceptual diagram of a five-tap vertical filter 120, according to the prior art. The five-tap vertical filter 120 includes a first line store 122, a second line store 123, a third line store 124, a fourth line store 125, a fifth line store 126 and a five-tap filter 128. The five-tap filter 128 may be any five-tap filter that provides a desired frequency response. The source image pixels are input into the first line store 122. The output of the first line store 122 is coupled to the five-tap filter 128 and to the input of the second line store 123. The output of the second line store 123 is coupled to the five-tap vertical filter 128 and the input of the third line store 124. The output of the third line store 124 is coupled to the five-tap filter 128 and the input of the fourth line store 125. The output of the fourth line store 125 is coupled to the five-tap filter 128 and the input of the fifth line store 126. The output of the fifth line store 126 is coupled to the five-tap filter 128. As in the case of the two-tap vertical filter 100, each source image line required by the five-tap filter 128 is stored in the line stores 122, 123, 124, 125 and 126. Again, the length and width requirements of the line stores described above in connection with the two-tap vertical filter 100 apply with equal force to the five-tap vertical filter 120.

Figure 1D:
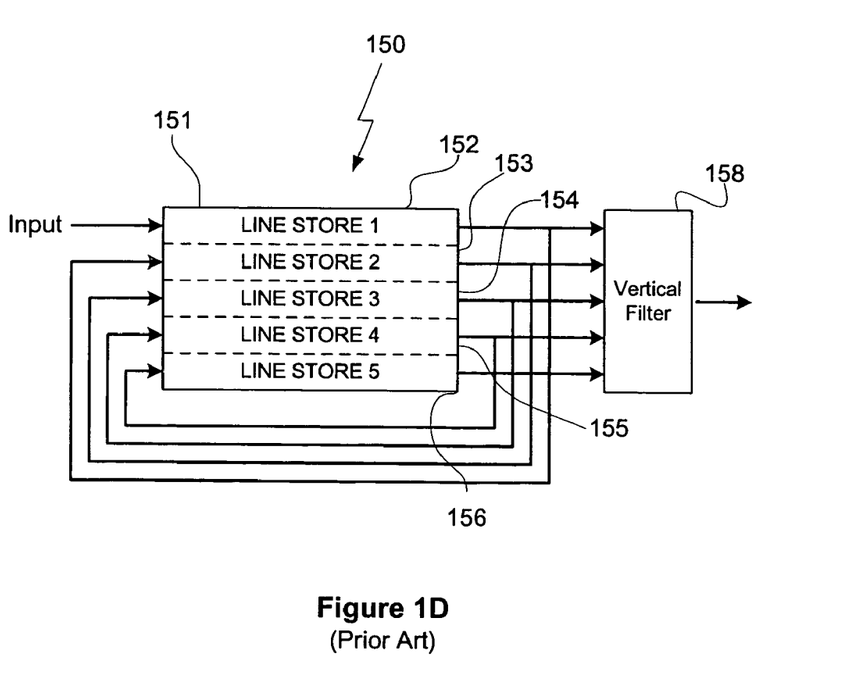
FIG. 1D is a conceptual diagram of a configurable vertical filter, according to the prior art.

FIG. 1D is a conceptual diagram of a configurable vertical filter 150, according to the prior art. The configurable vertical filter 150 includes a configurable memory 151 and filter 158. The configurable memory 151 is configured as five line stores—a first line store 152, a second line store 153, a third line store 154, a fourth line store 155 and a fifth line store 156. Source image pixels are input to the first line store 152. The output of the first line store 152 is coupled to the filter 158 and to the input of the second line store 153. The output of the second line store 153 is coupled to the filter 158 and the input of the third line store 154. The output of the third line store 154 is coupled to the filter 158 and the input of the fourth line store 155. The output of the fourth line store 155 is coupled to the filter 158 and the input of the fifth line store 156. The output of the fifth line store 156 is coupled to the filter 158. The filter 158 can be configured to implement any two-tap, three-tap or five-tap filter with a desired frequency response.

As is well-known, by appropriately configuring the configurable memory 151 and the filter 158, the configurable vertical filter 150 may be configured to provide the functionality of either the two-tap vertical filter of FIG. 1A, the three-tap vertical filter of FIG. 1B or the five-tap vertical filter of FIG. 1C. For example, when the configurable vertical filter 150 is configured to implement the five-tap vertical filter 120 of FIG. 1C, the five line stores 152, 153, 154, 155 and 156 are used to store the source image lines and the vertical filter 158 is configured to implement a five-tap filter. In this case, since all five line stores are utilized, one hundred percent of the configurable memory 151 is used. However, when the configurable vertical filter 150 is configured to implement the three-tap vertical filter 110 of FIG. 1B only the first line store 152, the second line store 153 and the third line store 154 are used to store the source image lines. Since only three of the five line stores are utilized, only sixty percent of the configurable memory 151 is used. Similarly, when the configurable vertical filter 150 is configured to implement the two-tap vertical filter 100 of FIG. 1A, only forty percent of the configurable memory 151 is used since only two of five line stores are utilized.

As the foregoing illustrates, a substantial amount of RAM may not be used in certain vertical filter implementations. As a general matter, having unused or underutilized RAM is undesirable because it reflects wasted die space, which is a precious commodity in densely populated integrated circuit designs.

In addition, because different pixel formats oftentimes are represented with different numbers of bits, supporting different pixel formats also may result in unused or underutilized RAM in current vertical filter designs. Consider a typical RGB pixel. Each pixel has three components, red, green and blue, and each of these components has a common bit width. If the red, green and blue components are each eight bits wide, then the RGB pixel is twenty-four bits wide. Next consider the YUV422 pixel structure, which requires two luminance (Y) components for every red color-difference (Cr) and blue color-difference (Cb) component. Thus, YUV422 pixels are always grouped in pairs, where a first YUV422 pixel includes all three components (Y, Cb and Cr), while a second YUV422 pixel includes only the luminance (Y) component. Therefore, if the Y, Cb and Cr components are each eight bits wide, then the YUV422 pixel pair is thirty-two bits wide. As described in FIG. 1A, a line store is designed to be wide enough to support the widest pixel format that the associated vertical filter is required to process. Since the YUV422 pixel is wider than the RGB pixel, the line stores of a vertical filter designed to process both RGB and YUV422 pixels are designed to be thirty-two bits wide. Thus, when processing RGB pixels, eight bits of width of each line store in the vertical filter are unused, further increasing the overall amount of unused or underutilized RAM in the vertical filter.

As the foregoing illustrates, what is needed in the art is a configurable vertical filter that uses RAM more efficiently than current vertical filter designs.

SUMMARY OF THE INVENTION

One embodiment of a configurable multi-tap filter includes a parallel-to-serial formatter configured to transform a pixel stream into a first component pixel stream and a second component pixel stream, a configurable memory that includes a first channel and a second channel, wherein pixels from the first component pixel stream are stored in the first channel and pixels from the second component pixel stream are stored in the second channel, and a multi-tap filter configured to process a component of a pixel from the first channel and a like component of a pixel from the second channel. In various embodiments, the configurable multi-tap filter may be implemented as a two-tap, three-tap or five-tap filter and may be used to process either RGB or YUV pixels streams.

One advantage of the disclosed configurable multi-tap filter is that it uses memory more efficiently than prior art filters.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
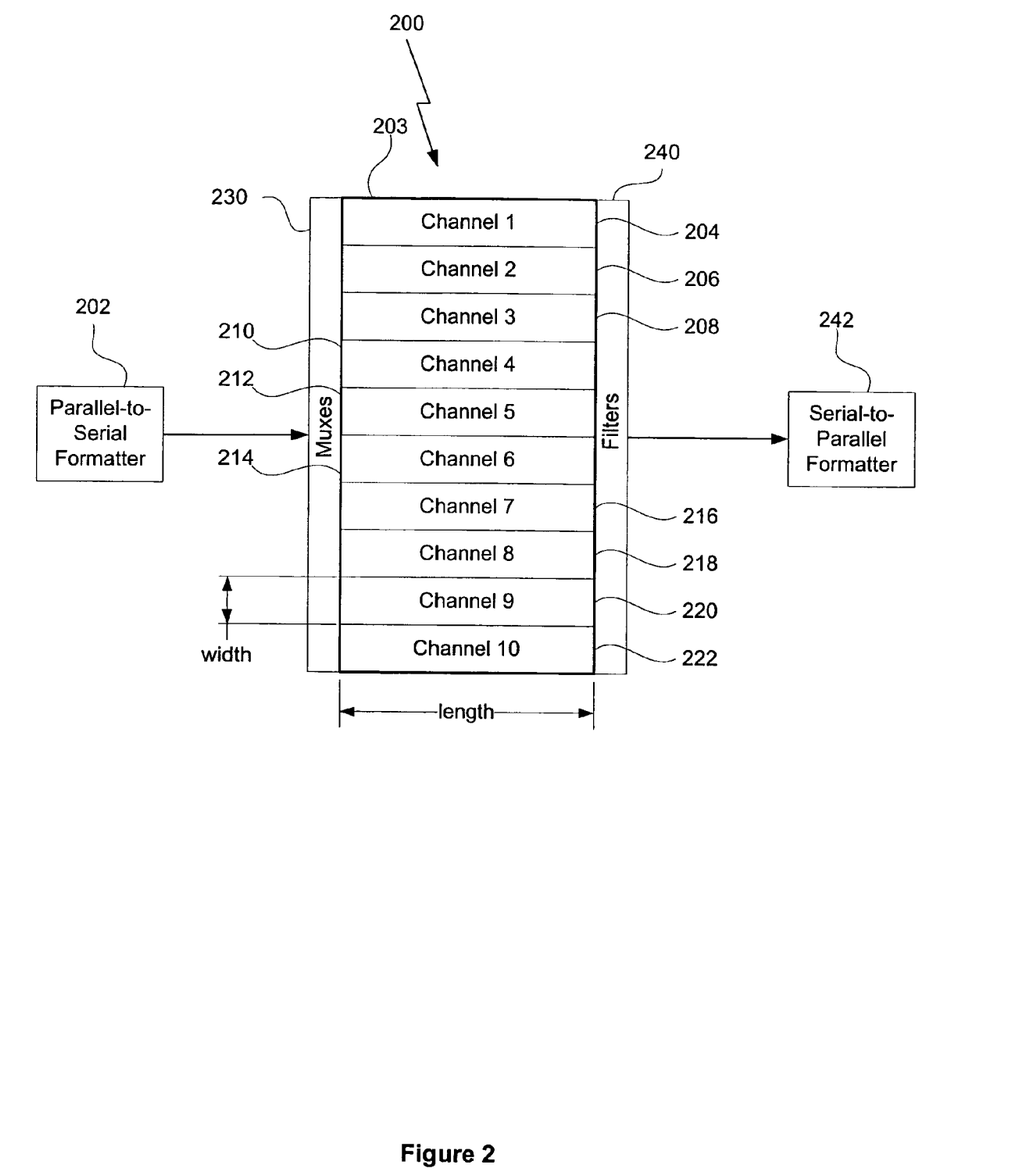
FIG. 2 is a conceptual diagram of a configurable multi-tap filter, according to one embodiment of the invention.

FIG. 2 is a conceptual diagram of a configurable multi-tap filter 200, according to one embodiment of the invention. The configurable multi-tap filter 200 includes, without limitation, a parallel-to-serial formatter 202, a configurable memory 203, muxes 230, filters 240 and a serial-to-parallel formatter 242. The parallel-to-serial formatter 202 is coupled to the muxes 230 and is configured to receive source image pixels. As described in greater detail below in conjunction with FIGS. 6A-6C, the muxes 230 are coupled to the configurable memory 203 and are configured to route the output of the parallel-to-serial formatter 202 to the different channels of configurable memory 203. The configurable memory 203 is coupled to the different inputs of the filters 240. The different outputs of the filters 240 are coupled to the serial-to-parallel formatter 242, which is configured to output processed source image pixels.

As shown, the configurable memory 203 is separated into ten channels—a first channel 204, a second channel 206, a third channel 208, a fourth channel 210, a fifth channel 212, a sixth channel 214, a seventh channel 216, an eighth channel 218, a ninth channel 220 and a tenth channel 222. In other embodiments, the configurable memory 203 may include more or less than ten channels. The channels 204, 206, 208, 210, 212, 214, 216, 218, 220 and 222 are used to store source image pixels prior to processing those pixels in the filters 240. The lengths of these channels determine, in part, the number of source image pixels that can be stored in the configurable memory 203, and the widths of the channels correspond to the widths of the pixel streams generated by the parallel-to-serial formatter 202. The channel length and width are described in greater detail below in conjunction with FIG. 5. The output of each of the channels 204, 206, 208, 210, 212, 214, 216, 218, 220 and 222 is coupled to the filters 240.

In operation, the parallel-to-serial formatter 202 receives a stream of source image pixels and transforms them into one or more component pixel streams that are transmitted to the muxes 230. The parallel-to-serial formatter 202 and the component pixel streams are described in greater detail below in conjunction with FIGS. 3A-3B and 4A-4B. The muxes 230 enable the component pixel streams to be routed from the parallel-to-serial formatter 202 to the different channels of the configurable memory 203. In this fashion, the muxes 230 enable the configurable memory 203 to be configured to support different types of vertical filters. This approach is described in greater detail below in conjunction with FIGS. 6A, 6B and 6C. The filters 240 may be configured to provide the filtering functionality of one or more filters of any type, including without limitation, two-tap, three-tap or five-tap filters. Each tap of a filter typically requires a source image line to be stored. Therefore, the exact configuration of the filters 240 determines the number of source image lines that should be stored within the configurable memory 203. The serial-to-parallel formatter 242 transforms the processed component pixel streams generated by the filters 240 to their original pixel stream format (i.e., to the format of the stream of source pixels input into the parallel-to-serial formatter 202). Serial-to-parallel formatter 242 essentially implements the inverse process of the parallel-to-serial formatter 202. The output of the serial-to-parallel formatter 242 is a processed source image pixel stream.

Figure 3A:
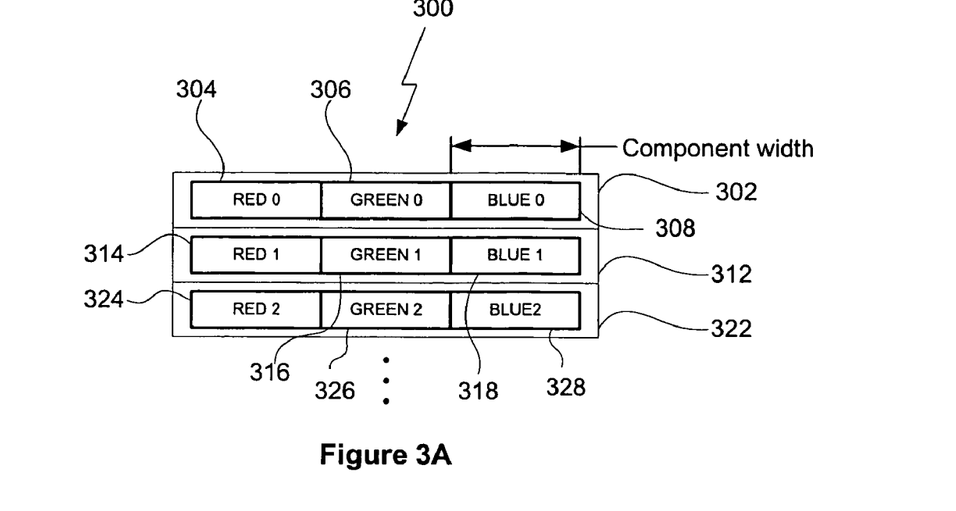
FIG. 3A is a conceptual diagram illustrating a portion of a typical RGB pixel stream.

FIG. 3A is a conceptual diagram illustrating a portion of a typical RGB pixel stream 300. This portion of a typical RGB pixel stream 300 includes a first pixel 302, a second pixel 312 and a third pixel 322. Generally, RGB pixel streams include more than three pixels, however, only three are shown here for clarity. Each pixel is comprised of three components. The first pixel 302 includes a first red component 304, a first green component 306 and a first blue component 308. Similarly, the second pixel 312 includes a second red component 314, a second green component 316 and a second blue component 318. In like fashion, the third pixel 322 includes a third red component 324, a third green component 326 and a third blue component 328. Each of these components consists of the same number of bits, expressed as a component width. For example, if the red, green and blue components are eight bits wide, then the component width is eight bits.

The parallel-to-serial formatter 202 is configured to transform a pixel stream into one or more component pixel streams, depending on the type of filter realized by the configurable multi-tap filter 200 as well as the desired pixel throughput for that filter. For example, if the configurable multi-tap filter 200 is implemented as a three-tap vertical filter, then parallel-to-serial formatter 202 may be configured to generate two or three component pixel streams. If the parallel-to-serial formatter 202 were configured to generate two component pixel streams, then the pixel throughput for the three-tap vertical filter would be 0.667 pixels per clock for RGB data and one pixel per clock for YUV422 data. If, on the other hand, the parallel-to-serial formatter 202 were configured to generate three component pixel streams, then the pixel throughput of the three-tap vertical filter would be one pixel per clock for RGB data and 1.5 pixels per clock for YUV422 data. In other embodiments, the parallel-to-serial formatter 202 may be configured to generate more than three component pixel streams. Generally, increasing the number of generated component pixels streams increases the pixel throughput of the configurable multi-tap filter 200. The relationship between the number of component pixel streams, pixel throughput and the selected vertical filter type is described in greater detail below in conjunction with FIGS. 6A-6C.

Figure 3B:
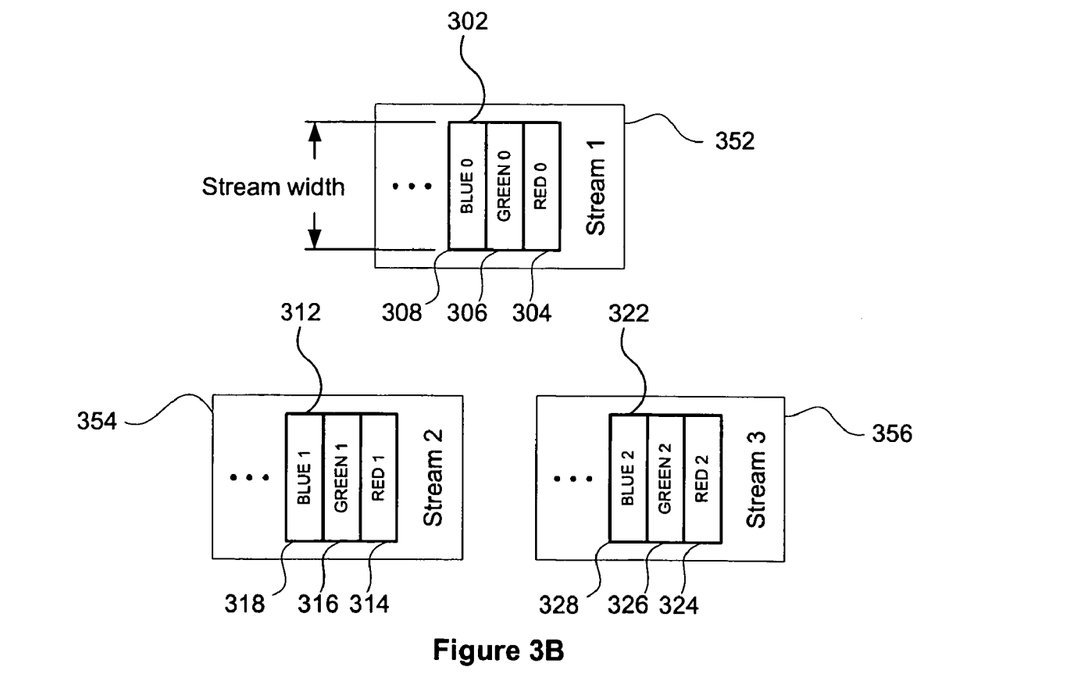
FIG. 3B is a conceptual diagram illustrating a first component pixel stream, a second component pixel stream and third component pixel stream generated by the parallel-to-serial formatter of FIG. 2, according to one embodiment of the invention.

FIG. 3B is a conceptual diagram illustrating a first component pixel stream 352, a second component pixel stream 354 and third component pixel stream 356 generated by the parallel-to-serial formatter 202 of FIG. 2, according to one embodiment of the invention. In this embodiment, the parallel-to-serial formatter 202 is configured to transform the RGB stream 300 of FIG. 3A into the three component pixel streams by alternately allocating the pixels of the RGB stream 300 to the first component pixel stream 352, the second component pixel stream 354 and the third component pixel stream 356. Thus, the components of the first pixel 302 (i.e., the first red component 304, the first green component 306 and the first blue component 308) are included in the first component pixel stream 352, the components of the second pixel 312 (i.e., the second red component 314, the second green component 316 and the second blue component 318) are included in the second component pixel stream 354, and the components of the third pixel 322 (i.e., the third red component 324, the third green component 326 and the third blue component 328) are included in the third component pixel stream 356. Further, the first component pixel stream 352 includes components from every third pixel of the RGB stream 300 relative to the first pixel 302, such as the fourth, seventh, and tenth pixels (not shown). Similarly, the second component pixel stream 354 includes components from every third pixel of the RGB stream 300 relative to the second pixel 312, such as a fifth, eighth, and eleventh pixels (not shown). Finally, the third component pixel stream 356 includes components from every third pixel of the RGB stream 300 relative to the third pixel 322, such as a sixth, ninth, and twelfth pixels (not shown).

Importantly, the parallel-to-serial formatter 202 is configured to construct each component pixel stream such that the components of the various pixels are arranged serially with respect to one another within the component pixel stream. For example, in the first component pixel stream 352, the first red component 304, the first green component 306 and the first blue component 308 of the first pixel 302 are arranged in such a serial fashion. The consequence of such a construction is that the width of a component pixel stream is equal to the width of the individual pixel components (as opposed to the width of the entire pixel, as with a typical pixel stream). For example, if the red, blue and green components of the pixels in an RGB pixel stream are eight bits wide, then the resulting component pixel stream is eight bits wide. Further, as further described in FIG. 5, since the component pixel stream is stored in the channels of the configurable memory 203, the widths of each channel also may be equal to the width of the individual pixel components (as opposed to the width of the entire pixel, as with a prior art line store).

In embodiments where the parallel-to-serial formatter 202 is configured to generate only two component pixel streams, the pixels from the RGB stream 300 would be alternately allocated to the first component pixel stream 352 and the second component pixel stream 354. Thus, the first component pixel stream 352 would include the components of the first pixel 302, the third pixel 322, the fifth pixel (not shown), etc., while the second component pixel stream 354 would include the components of the second pixel 312, the fourth pixel (not shown), the sixth pixel (not shown), etc.

Figure 4A:
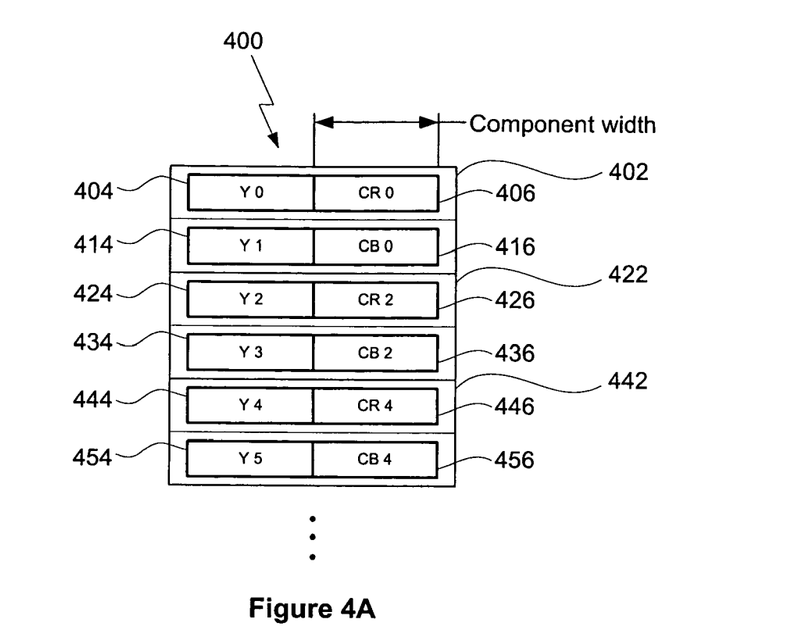
FIG. 4A is a conceptual diagram illustrating a portion of a typical YUV422 pixel stream.

FIG. 4A is a conceptual diagram illustrating a portion of a typical YUV422 pixel stream 400. This portion of a typical YUV422 pixel stream 400 includes a first pixel pair 402, a second pixel pair 422 and a third pixel pair 442. Generally, YUV422 pixel streams include more than three pixel pairs, however, only three are shown here for clarity. Each pixel pair is comprised of four components—a two luminance (Y) components, a blue color-difference (Cb) component and a red color-difference (Cr) component. The luminance component is sampled twice as often as the color-difference components resulting in a pixel structure that is different from the pixel structure of the RGB stream 300. The first pixel pair 402 includes a first luminance component 404, a first red color-difference component 406, a second luminance component 414 and a first blue color-difference component 416. Similarly, the second pixel pair 422 includes a third luminance component 424, a second red color-difference component 426, a fourth luminance component 434 and a second blue color-difference component 436. In like fashion, the third pixel pair 442 includes a fifth luminance component 444, a third red color-difference component 446, a sixth luminance component 454 and a third blue color-difference component 456. Each of these components consists of the same number of bits, expressed as a component width. For example, if the luminance, blue color-difference and red color-difference components are eight bits wide, then the component width is eight bits.

Figure 4B:
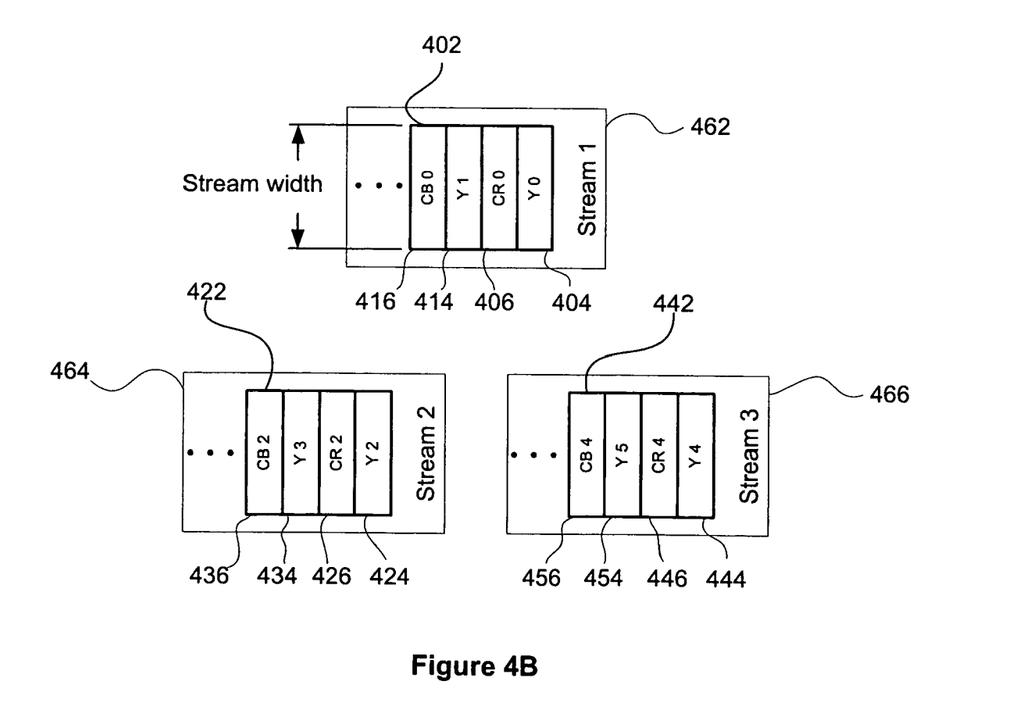
FIG. 4B is a conceptual diagram illustrating a first component pixel stream, a second component pixel stream and third component pixel stream generated by the parallel-to-serial formatter of FIG. 2, according to another embodiment of the invention.

FIG. 4B is a conceptual diagram illustrating a first component pixel stream 462, a second component pixel stream 464 and third component pixel stream 464 generated by the parallel-to-serial formatter 202 of FIG. 2, according to another embodiment of the invention. In this embodiment, the parallel-to-serial formatter 202 is configured to transform the YUV422 stream 400 of FIG. 4A into the three component pixel streams by alternately allocating the pixels of the YUV422 stream 400 to the first component pixel stream 462, the second component pixel stream 464 and the third component pixel stream 466. Thus, the components of the first pixel pair 402 (i.e., the first luminance component 404, the first red color-difference component 406, the second luminance component 414 and the first blue color-difference component 416) are included in the first component pixel stream 462, the components of the second pixel pair 422 (i.e., the third luminance component 424, the second red color-difference component 426, the fourth luminance component 434 and the second blue color-difference component 436) are included in the second component pixel stream 464, and the components of the third pixel pair 442 (i.e., the fifth luminance component 444, the third red color-difference component 446, the sixth luminance component 454 and the third blue color-difference component 456) are included in the third component pixel stream 466. In alternative embodiments, the ordering of the components of the pixel pairs within the generated component pixel streams may be different. Further, the first component pixel stream 462 includes components from every third pixel pair of the YUV422 stream 400 relative to the first pixel pair 402, such as the fourth, seventh, and tenth pixel pairs (not shown). Similarly, the second component pixel stream 464 includes components from every third pixel pair of the YUV422 stream 300 relative to the second pixel pair 422, such as a fifth, eighth, and eleventh pixel pairs (not shown). Finally, the third component pixel stream 466 includes components from every third pixel pair of the YUV422 stream 400 relative to the third pixel pair 442, such as a sixth, ninth, and twelfth pixel pairs (not shown).

Again, the parallel-to-serial formatter 202 is configured to construct each component pixel stream such that the components of the various pixel pairs are arranged serially with respect to one another within the component pixel stream. For example, in the first component pixel stream 462, the first luminance component 404, the first red color-difference component 406, the second luminance component 414 and the first blue color-difference component 416 of the first pixel pair 402 are arranged in such a serial fashion. The consequence of such a construction is that the width of a component pixel stream is equal to the width of the individual pixel components (as opposed to the width of the pixel pair, as with a typical YUV422 pixel stream). For example, if the luminance, red color-difference and blue color-difference components of the pixels in a YUV422 pixel stream are eight bits wide, then the resulting component pixel stream is eight bits wide. Further, as further described in FIG. 5, since the component pixel stream is stored in the channels of the configurable memory 203, the widths of each channel also may be equal to the width of the individual pixel components (as opposed to the width of the entire pixel pair, as with a prior art line store).

In embodiments where the parallel-to-serial formatter 202 is configured to generate only two component pixel streams, the pixels from the YUV422 stream 400 would be alternately allocated to the first component pixel stream 462 and the second component pixel stream 464. Thus, the first component pixel stream 462 would include the components of the first pixel pair 402, the third pixel pair 442, the fifth pixel (not shown), etc., while the second component pixel stream 464 would include the components of the second pixel pair 422, the fourth pixel (not shown), the sixth pixel (not shown), etc.

The parallel-to-serial formatter 202 advantageously allows both an RGB stream and a YUV422 stream to be efficiently stored in a common channel. For example, in one embodiment, an RGB stream that is twenty-four bits wide and a YUV422 stream that is sixteen bits wide can each be transformed into two or more component pixel streams that are eight bits wide. In such a case, both sets of component pixel streams may be stored in channels that are only eight bits wide. In alternative embodiments, the serial-to-parallel formatter 202 may be configured to handle other pixel formats such as YUV444. In yet other alternative embodiments, the serial-to-parallel formatter 202 may be configured to generate more than three component pixel streams.

Figure 5:
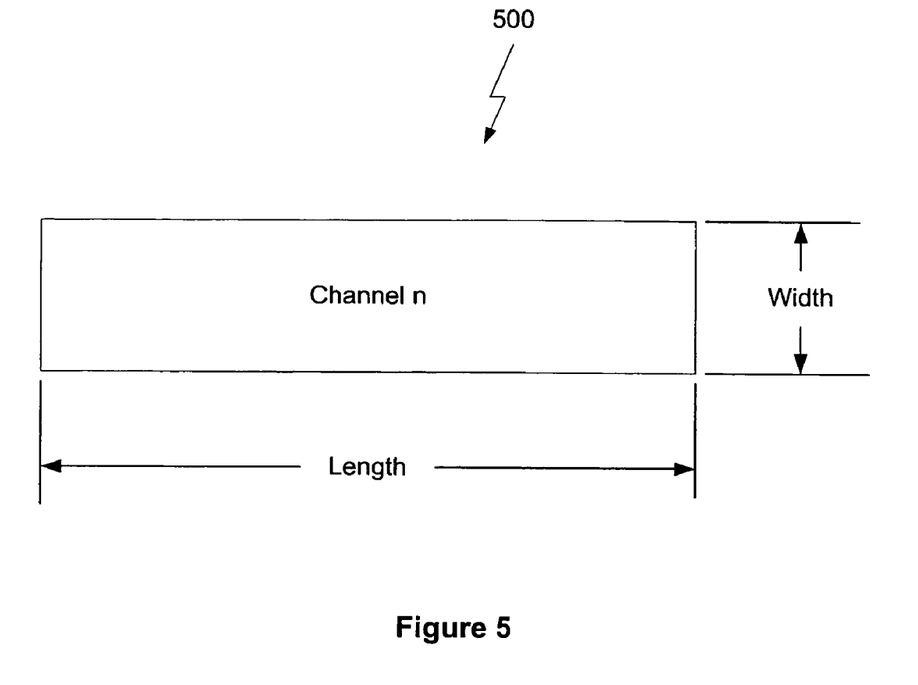
FIG. 5 is a conceptual diagram illustrating the configuration of a channel of the configurable memory 203 of FIG. 2, according to one embodiment of the invention.

FIG. 5 is a conceptual diagram illustrating the configuration of a channel 500 of the configurable memory 203 of FIG. 2, according to one embodiment of the invention. The width of the channel 500 is preferably the same width as the component pixel streams generated by the parallel-to-serial formatter 202. As previously described herein, in one embodiment, the width of the component pixel stream generated from an RGB stream is the same as the width of the component pixel stream generated from a YUV422 pixel stream. Thus, in such a case, there is no wasted space in any channel of the configurable memory 203 in the form of unused bits. In other embodiments, where the parallel-to-serial formatter 202 generates component pixel streams having different widths, the width of the channel 500 may be the same as the width of the widest component pixel stream.

The channel 500 is designed with a length that enables the configurable memory 203 to properly store the component pixel stream generated from the longest source image line processed by the multi-tap configurable filter 200. In addition, as described greater detail below in conjunction with FIGS. 6A-6C, since the implementation of the filters 240 determines the number of channels allocated to storing the different component pixel streams generated by the parallel-to-serial formatter 202, the length of the channels depends, in part, on the specific implementation of the filters 240.

Figure 6A:
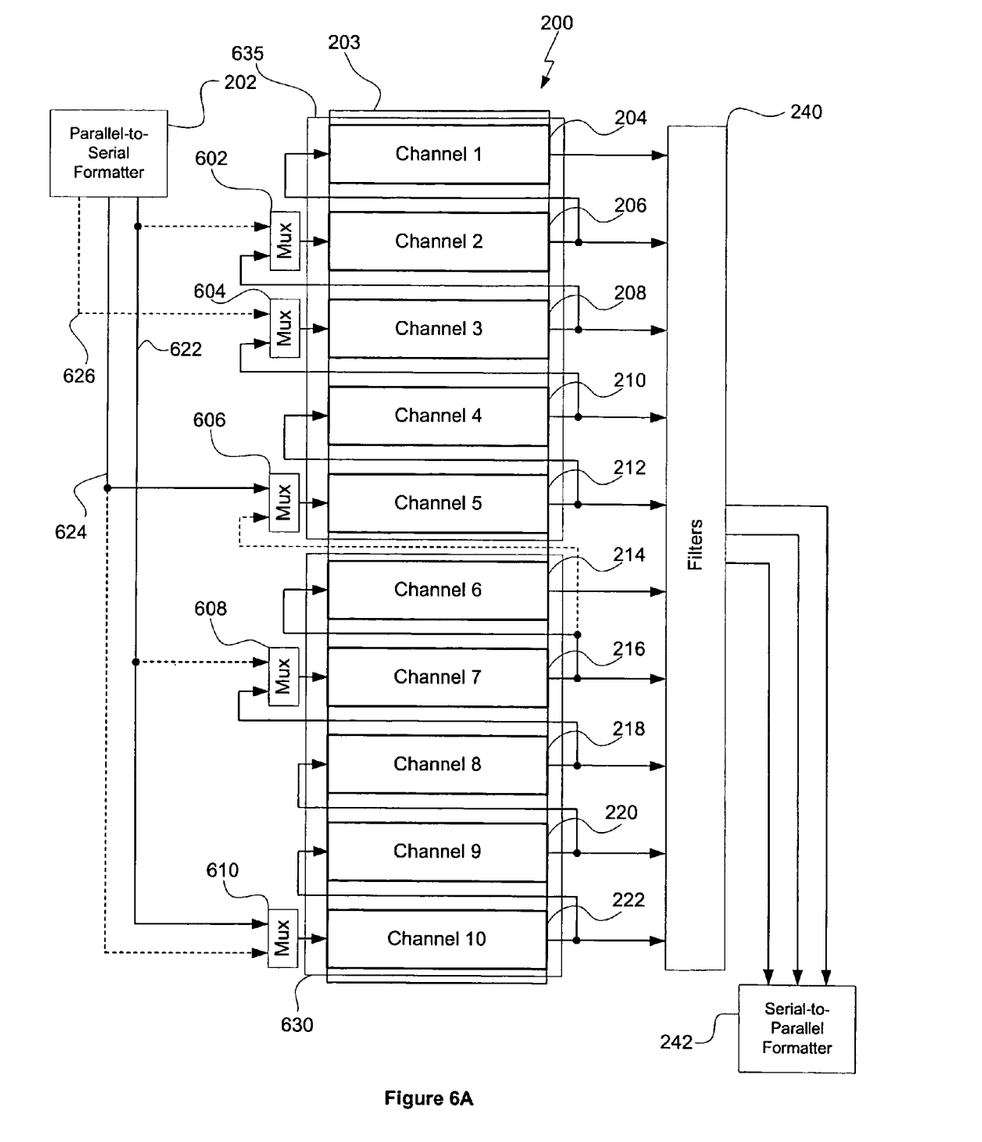
FIG. 6A is a conceptual diagram of the configurable multi-tap filter 200 of FIG. 2 configured as a five-tap vertical filter, according to one embodiment of the invention.

FIG. 6A is a conceptual diagram of the configurable multi-tap filter 200 of FIG. 2 configured as a five-tap vertical filter that processes one pixel of YUV422 data per clock cycle, according to one embodiment of the invention. To help clarify the data flow, the data paths and channels that are not used in this configuration are shown as dashed lines. In this embodiment, the configurable multi-tap filter 200 includes, without limitation, the parallel-to-serial formatter 202, the configurable memory 203, the serial-to-parallel formatter 242 and the filters 240 of FIG. 2. The configurable multi-tap filter 200 also includes a first mux 602, a second mux 604, a third mux 606, a fourth mux 608, a fifth mux 610, which are the muxes 230 of FIG. 2 shown in greater detail. Each of these muxes functions as a switch that allows one of one or more input signals to be further routed as an output signal.

To support a five-tap vertical filter implementation, the configurable memory 203 is separated into a first group of channels 630 and a second group of channels 635, each comprising five channels. Each of the first and second groups of channels 630 and 635 requires a component pixel stream as an input; therefore, the parallel-to-serial formatter 202 is configured to transform the source image pixel stream into two component pixel streams—a first component pixel stream 622 and a second component pixel stream 624. If the multi-tap configurable filter 200 is configured to process YUV422 pixel data, then a throughput of one pixel per clock cycle results since, for every clock cycle, each of the first component pixel stream 622 and the second component pixel stream 624 transports one of the two pixel components comprising a YUV422 pixel. If, however, the multi-tap configurable filter 200 is configured to process RGB pixel data, then a throughput of only 0.667 pixels per clock cycle results since, for every clock cycle, each of the first component pixel stream 622 and the second component pixel stream 624 transports only one of the three pixel components comprising an RGB pixel. In alternative embodiments, the throughput associated with processing either YUV422 or RGB pixels may be increased by configuring parallel-to-serial formatter 202 to generate additional component pixel streams. Persons skilled in the art will understand that the multi-tap configurable filter 200 would include additional taps to support the additional component pixel streams and that serial-to-parallel formatter 242 would be configured to transform all of the processed component pixel streams generated by the filters 240 (including those associated with the additional taps) to their original pixel stream format.

The first group of channels 630 is configured as follows. The fifth mux 610 is configured to route the first component pixel stream 622 to the input of the tenth channel 222. The output of the tenth channel 222 is coupled to the filters 240 and to the input of the ninth channel 220. The output of the ninth channel 220 is coupled to the filters 240 and to the input of the eighth channel 218. The output of the eighth channel 218 is coupled to the filters 240 and to the input of the fourth mux 608. The fourth mux 608 is configured to route the output of the eighth channel 218 to the input of the seventh channel 216. The output of the seventh channel 216 is coupled to the filters 240 and to the input of the sixth channel 214. The output of the sixth channel 214 is coupled to the filters 240.

The second group of channels 635 is configured as follows. The third mux 606 is configured to route the second component pixel stream 624 to the input of the fifth channel 212. The output of the fifth channel 212 is coupled to the filters 240 and to the input of the fourth channel 210. The output of the fourth channel 210 is coupled to the filters 240 and to the second mux 604. The second mux 604 is configured to route the output of the fourth channel 210 to the input of the third channel 208. The output of the third channel 208 is coupled to the filters 240 and to the input of the first mux 602. The first mux 602 is configured to route the output of the third channel 208 to the input of the second channel 206. The output of the second channel 206 is coupled to the filters 240 and to the input of the first channel 204. The output of the first channel 204 is coupled to the filters 240.

Finally, the tenth channel 222, the ninth channel 220, the eighth channel 218, the seventh channel 216 and the sixth channel 214 are coupled to the filters 240 where a five-tap filter, with a desired frequency response, is implemented (not shown). Thus, the combination of the first group of channels 630 and the filters 240 operates as a five-tap vertical filter having functionality similar to that of the five-tap vertical filter 120 of FIG. 1C. In similar fashion, the second group of channels 635 is coupled to the filters 240 where a second five-tap filter is implemented (not shown), thereby realizing a second five-tap vertical filter having functionality similar to that of the five-tap vertical filter of FIG. 1C. As persons skilled in the art understand, there are many ways to configure the filters 240 to optimally process the alternating component pixel streams 622 and 624 from the first and the second groups of channels 630 and 635.

By grouping the channels of the configurable memory 203 into two groups comprising five channels each, the configurable multi-tap filter 200 uses all ten channels to implement the storage for the two five-tap vertical filters. Thus, one hundred percent of the configurable memory 203 is used, which is comparable to the memory usage efficiency of the configurable vertical filter 150 of FIG. 1D. In addition, since the first and second component pixel streams 622 and 624 include the alternating pixel components of the source image, a single source image line is stored using two channels.

As also shown in FIG. 6A, the filters 240 are configured to output the processed component pixel streams to the serial-to-parallel formatter 242. The serial-to-parallel formatter 242 receives the processed component pixel streams from the filters 240 and transforms them back to their original pixel stream format (i.e., the format of the stream of source pixels input into the parallel-to-serial formatter 202) to generate a processed pixel stream. The serial-to-parallel formatter 242 is configured to implement the inverse processing of the parallel-to-serial formatter 202 by recombining the components of a pixel into a single pixel and also interleaving the two alternating pixels of the processed component streams into a single processed pixel stream. The result is the processed pixel stream.

Figure 6B:
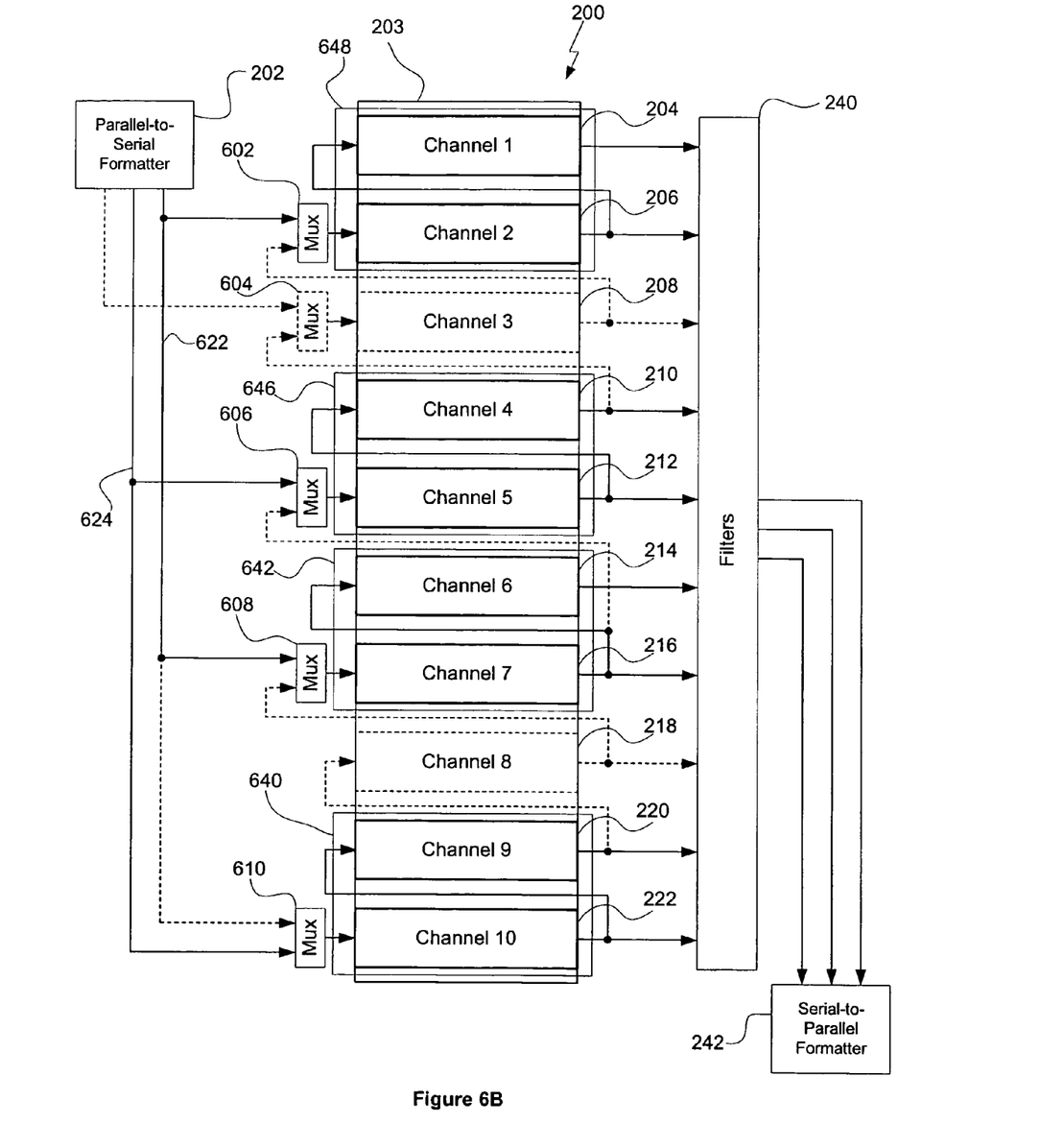
FIG. 6B is a conceptual diagram of the configurable multi-tap filter 200 of FIG. 2 configured as a two-tap vertical filter, according to one embodiment of the invention.

FIG. 6B is a conceptual diagram of the configurable multi-tap filter 200 of FIG. 2 configured as a two-tap vertical filter processing one pixel of YUV422 data per clock cycle, according to one embodiment of the invention. Again, to help clarify the data flow, the data paths and channels that are not used in this configuration are shown as dashed lines.

To support a two-tap vertical filter implementation, the configurable memory 203 is separated into a first group of channels 640, a second group of channels 642, a third group of channels 646 and a fourth group of channels 648, each comprising two channels. The first and third group of channels 640 and 646 require a component pixel stream as an input, while the second and fourth group of channels 642 and 648 require another component pixel stream as an input;

therefore, the parallel-to-serial formatter 202 is configured to transform the source image pixel stream into two component pixel streams—a first component pixel stream 622 and a second component pixel stream 624. Again, if the multi-tap configurable filter 200 is configured to process YUV422 pixel data, then a throughput of one pixel per clock cycle results since, for every clock cycle, each of the first component pixel stream 622 and the second component pixel stream 624 transports one of the two pixel components comprising a YUV422 pixel. If, however, the multi-tap configurable filter 200 is configured to process RGB pixel data, then a throughput of only 0.667 pixels per clock cycle results since, for every clock cycle, each of the first component pixel stream 622 and the second component pixel stream 624 transports only one of the three pixel components comprising an RGB pixel. In alternative embodiments, the throughput associated with processing either YUV422 or RGB pixels may be increased by configuring parallel-to-serial formatter 202 to generate additional component pixel streams. Persons skilled in the art will understand that the multi-tap configurable filter 200 would include additional taps to support the additional component pixel streams and that serial-to-parallel formatter 242 would be configured to transform all of the processed component pixel streams generated by the filters 240 (including those associated with the additional taps) to their original pixel stream format.

The first group of channels 640 is configured as follows. The fifth mux 610 is configured to route the second component pixel stream 624 to the input of the tenth channel 222. The output of the tenth channel 222 is coupled to the filters 240 and to the input of the ninth channel 220. The output of the ninth channel 220 is coupled to the filters 240.

The second group of channels 642 is configured as follows. The fourth mux 608 is configured to route the first component pixel stream 622 to the input of the seventh channel 216. The output of the seventh pixel channel 216 is coupled to the filters 240 and to the input of the sixth channel 214. The output of the sixth channel 214 is coupled to the filters 240.

The third group of channels 646 is configured as follows. The third mux 606 is configured to route the second component pixel stream 624 to the input of the fifth channel 212. The output of the fifth channel 212 is coupled to the filters 240 and to the input of the fourth channel 210. The output of the fourth channel 210 is coupled to the filters 240.

The fourth group of channels 648 is configured as follows. The first mux 602 is configured to route the first component pixel stream 622 to the input of the second channel 206. The output of the second channel 206 is coupled to the filters 240 and to the input of the first channel 204. The output of the first channel 204 is coupled to the filters 240.

Finally, the tenth channel 222 and the ninth channel 220 are coupled to the filters 240 where a two-tap filter, with a desired frequency response, is implemented (not shown). Thus, the combination of the first group of channels 640 and the filters 240 operates as a two-tap vertical filter having functionality similar to that of the two-tap vertical filter 100 of FIG. 1A. In similar fashion, the second group of channels 642, the third group of channels 646 and the fourth group of channels 648 are coupled to the filters 240 where an additional two-tap filter is implemented (not shown), again, having functionality similar to that of the two-tap vertical filter 100 of FIG. 1A. In this embodiment, the two two-tap filters within filters 240 alternately process two channel pairs where the first channel pair includes the first group of channels 640 and the second group of channels 642, and the second channel pair includes the third group of channels 646 and the fourth group of channels 648. Again, persons skilled in the art will understand that there are many ways to configure the filters 240 to optimally process the alternating component pixel streams 622 and 624 from the first group of channels 640, second group of channels 642, third group of channels 646 and fourth group of channels 648.

By grouping the channels of the configurable memory 203 into four groups comprising two channels each, the configurable multi-tap filter 200 uses eight channels to implement the storage for the two two-tap vertical filters. Thus, eighty percent of the configurable memory 203 is used, which is forty percent greater than the memory usage that results when the configurable vertical filter 150 of FIG. 1D is configured to implement a two-tap vertical filter. Additionally, since the first and second component pixel streams 622 and 624 include the alternating pixel components of the source image, a single source image line is stored using four channels.

As also shown in FIG. 6B, the filters 240 are configured to output the processed component pixel streams to the serial-to-parallel formatter 242. Again, the serial-to-parallel formatter 242 receives the processed component pixel streams from the filters 240 and transforms them back to their original pixel stream format (i.e., the format of the stream of source pixels input into the parallel-to-serial formatter 202) to generate a processed pixel stream. The serial-to-parallel formatter 242 is configured to implement the inverse processing of the parallel-to-serial formatter 202 by recombining the components of a pixel into a single pixel and also interleaving the two alternating pixels of the processed component streams into a single processed pixel stream. The result is the processed pixel stream.

Figure 6C:
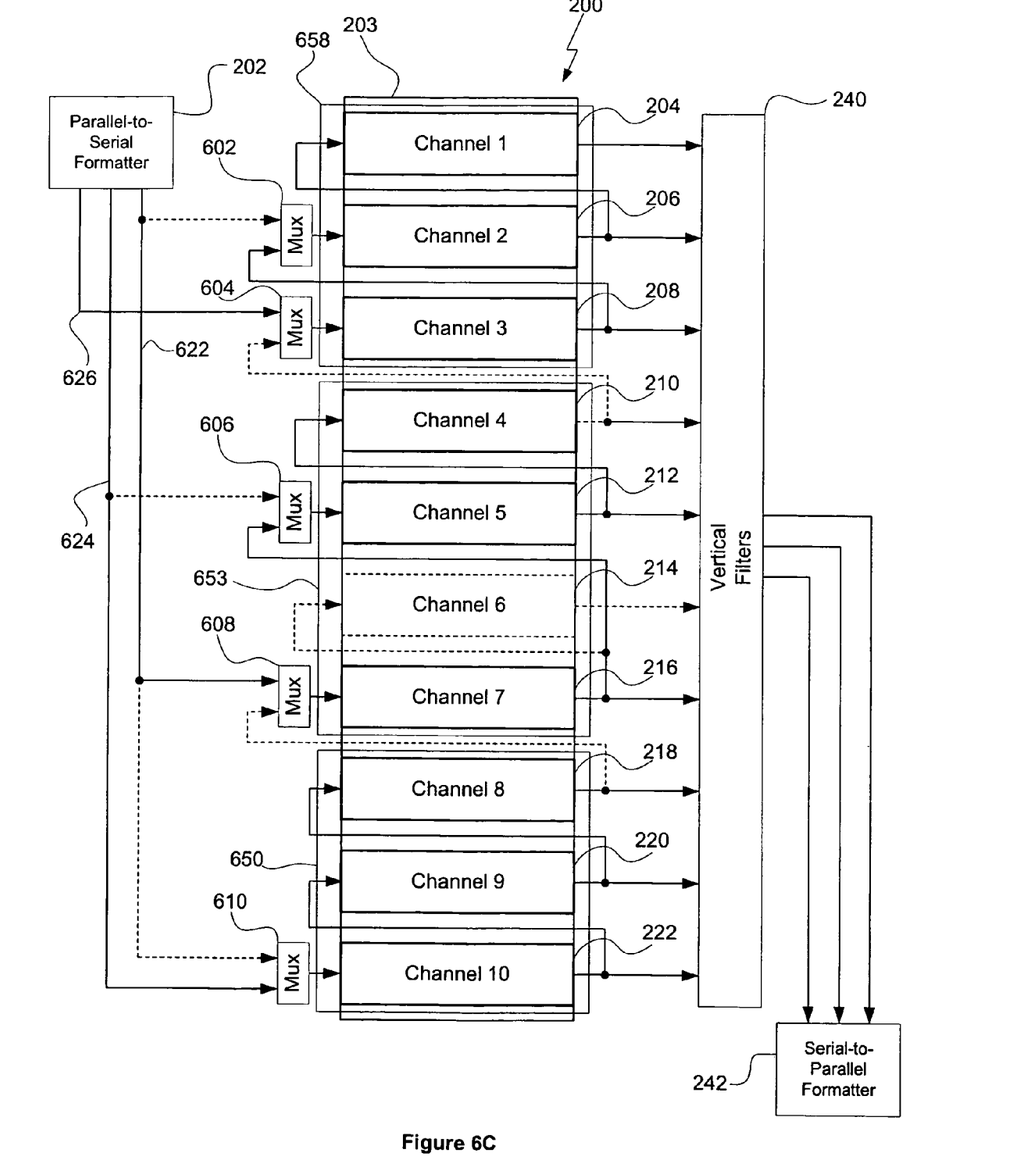
FIG. 6C is a conceptual diagram of the configurable multi-tap filter 200 of FIG. 2 configured as a three-tap vertical filter, according to one embodiment of the invention.

FIG. 6C is a conceptual diagram of the configurable multi-tap filter 200 of FIG. 2 configured as a three-tap vertical filter processing 1.5 pixels of YUV422 data per clock cycle, according to one embodiment of the invention. Again, to help clarify the data flow, the data paths and channels that are not used in this configuration are shown as dashed lines.

To support a three-tap vertical filter implementation, the configurable memory 203 is separated into a first group of channels 650, a second group of channels 653 and a third group of channels 658, each comprising three channels. Each of the first, second and third groups of channels 650, 653 and 658 require a component pixel stream as an input; therefore, the parallel-to-serial formatter 202 is configured to transform the source image pixel stream into three component pixel streams—a first component pixel stream 622, a second component pixel stream 624 and a third component pixel stream 626. If the multi-tap configurable filter 200 is configured to process YUV422 pixel data, then a throughput of 1.5 pixels per clock cycle results since, for every clock cycle, each of the first component pixel stream 622, the second component pixel stream 624 and the third component pixel stream 626 transports one of the two pixel components comprising a YUV422 pixel. If, however, the multi-tap configurable filter 200 is configured to process RGB pixel data, then a throughput of only one pixel per clock cycle results since, for every clock cycle, each of the first component pixel stream 622, the second component pixel stream 624 and the third component pixel stream 626 transports only one of the three pixel components comprising an RGB pixel. In alternative embodiments, the throughput associated with processing either YUV422 or RGB pixels may be increased by configuring parallel-to-serial formatter 202 to generate additional component pixel streams. Persons skilled in the art will understand that the multi-tap configurable filter 200 would include additional taps to support the additional component pixel streams and that serial-to-parallel formatter 242 would be configured to transform all of the processed component pixel streams generated by the filters 240 (including those associated with the additional taps) to their original pixel stream format.

The first group of channels 650 is configured as follows. The fifth mux 610 is configured to route the second component pixel stream 624 to the input of the tenth channel 222. The output of the tenth channel 222 is coupled to the filters 240 and to the input of the ninth channel 220. The output of the ninth channel 220 is coupled to the filters 240 and to the input of the eighth channel 218. The output of the eighth channel 218 is coupled to the filters 240.

The second group of channels 653 is configured as follows. The fourth mux 608 is configured to route the first component pixel stream 622 to the input of the seventh channel 216. The output of the seventh pixel channel 216 is coupled to the filters 240 and to the input of the third mux 606. The third mux is configured to route the output of the seventh channel 216 to the input of the fifth channel 212. The output of the fifth channel 212 is coupled to the filters 240 and to the input of the fourth channel 210. The output of the fourth channel 210 is coupled to the filters 240.

The third group of channels 658 is configured as follows. The fourth mux 604 is configured to route the third component pixel stream 626 to the third channel 208. The output of the third channel 208 is coupled to the filters 240 and to the input of the first mux 602. The first mux 602 is configured to route the output of the third channel 208 to the input of the second channel 206. The output of the second channel 206 is coupled to the filter 240 and to the input of the first channel 204. The output of the first channel 204 is coupled to the filters 240.

Finally, the tenth channel 222, the ninth channel 220 and the eighth channel 218 are coupled to the filters 240 where a three-tap filter, with a desired frequency response, is implemented (not shown). Thus, the combination of the first group of channels 650 and the filters 240 operates as a three-tap vertical filter having functionality similar to that of the three-tap vertical filter 110 of FIG. 1B. In similar fashion, the second group of channels 653 and third group of channels 658 are coupled to the filters 240 where two additional third three-tap filters are implemented (not shown), thereby realizing two additional three-tap vertical filters, each having functionality similar to that of the three-tap vertical filter 110 of FIG. 1B. Again, persons skilled in the art will understand that there are many ways to configure the filters 240 to optimally process the alternating component pixel streams 622, 624 and 626 from the first group of channels 650, the second group of channels 653 and the third group of channels 658.

By grouping the channels of the configurable memory 203 into three groups comprising three channels each, the configurable multi-tap filter 200 uses nine channels to implement the storage for the three three-tap vertical filters. Thus, ninety percent of the configurable memory 203 is used, which is thirty percent greater than the memory usage that results when the configurable vertical filter 150 of FIG. 1D is configured to implement a three-tap vertical filter. Additionally, since the first, second and third component pixel streams 622, 624 and 626 include the alternating pixel components of the source image, a single source image line is stored using three channels.

As also shown in FIG. 6C, the filters 240 are configured to output the processed component pixel streams to the serial-to-parallel formatter 242. Again, the serial-to-parallel formatter 242 receives the processed component pixel streams from the filters 240 and transforms them back to their original pixel stream format (i.e., the format of the stream of source pixels input into the parallel-to-serial formatter 202) to generate a processed pixel stream. The serial-to-parallel formatter 242 is configured to implement the inverse processing of the parallel-to-serial formatter 202 by recombining the components of a pixel into a single pixel and also interleaving the three alternating pixels of the processed component streams into a single processed pixel stream. The result is the processed pixel stream.

In other embodiments, the configurable multi-tap filter 200 may be configured to implement other types of vertical filters, such as a nine-tap or a ten-tap vertical filter. In still other embodiments, the amount of effective channel storage corresponding to a particular filter tap may be doubled by routing the output of one channel to the input of another channel. For example, the configurable multi-tap filter 200 may be configured to implement a single five-tap vertical filter using all ten channels grouped as five sets of two channels. Similarly, the amount of effective channel storage may be more than doubled by coupling together three or more channels and allocating those channels to a particular filter tap.

Figure 7:
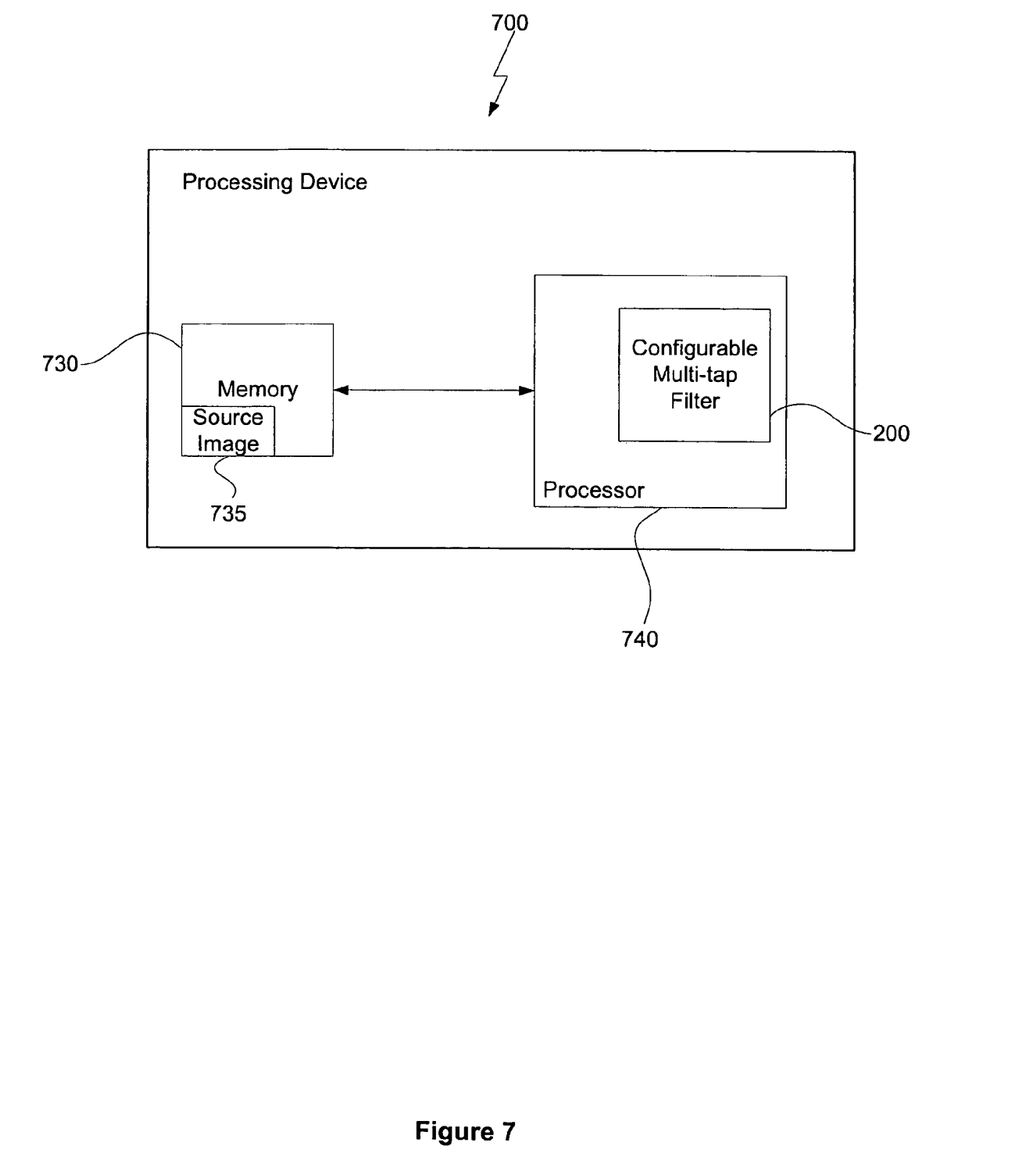
FIG. 7 is a conceptual diagram of a processing device that may be configured to implement one or more aspects of the present invention.

FIG. 7 is a conceptual diagram of a processing device 700 that may be configured to implement one or more aspects of the present invention. The processing device 700 includes, without limitation, a processor 740 and memory 730. The processing device may be a desktop computer, server, laptop computer, palm-sized computer, personal digital assistant, tablet computer, game console, cellular telephone, a television, a display device, such as a monitor or video projector, or any other type of similar device that processes image data. The processor 740 is coupled to the memory 730, which is used to store source image data 735. The processor 740 includes the configurable multi-tap filter 200, which processes the source image data 735 in the manner described herein.

While the foregoing is directed to embodiments of the present invention, other and further embodiments of the invention may be devised without departing from the basic scope thereof, and the scope thereof is determined by the claims that follow.

The invention claimed is:

1. A configurable multi-tap filter, comprising:
   a parallel-to-serial formatter configured to transform a pixel stream into a first component pixel stream and a second component pixel stream;
   a configurable memory that includes a first channel and a second channel, wherein pixels from the first component pixel stream are stored in the first channel and pixels from the second component pixel stream are stored in the second channel; and
   a multi-tap filter configured to process a component of a pixel from the first channel and a like component of a pixel from the second channel.

2. The configurable multi-tap filter of claim 1, wherein the multi-tap filter is further configured to generate at least a first processed component pixel stream associated with the first component pixel stream.

3. The configurable multi-tap filter of claim 2, further comprising a serial-to-parallel formatter configured to receive at least the first processed component pixel stream and, in response, generate a processed pixel stream.

4. The configurable multi-tap filter of claim 1, wherein the configurable memory includes ten channels.

5. The configurable multi-tap filter of claim 4, wherein the multi-tap filter is configured to support two five-tap filters.

6. The configurable multi-tap filter of claim 4, wherein the multi-tap filter is configured to support two two-tap filters.

7. The configurable multi-tap filter of claim 4, wherein the parallel-to-serial formatter is configured to transform the pixel stream into a first component pixel stream, a second component pixel stream and a third component pixel stream.

8. The configurable multi-tap filter of claim 7, wherein the multi-tap filter is configured to support three three-tap filters.

9. The configurable multi-tap filter of claim 1, wherein the pixel stream is an RGB pixel stream.

10. The configurable multi-tap filter of claim 1, wherein the pixel stream is a YUV pixel stream.

11. A computer-implemented method for performing multi-tap filtering, comprising:
   transforming a pixel stream into a first component pixel stream and a second component pixel stream, wherein the first component pixel stream includes pixels of the pixel stream that are not included in the second component pixel stream;
   storing pixels from the first component pixel stream into a first channel and pixels from the second component pixel stream into a second channel, wherein a width of each of the first channel and second channel equals a bit size of a pixel component; and
   processing a component of a pixel from the first channel and a like component of a pixel from the second channel.

12. The method of claim 11, further comprising the step of generating at least a first processed component pixel stream associated with the first component pixel stream.

13. The method of claim 12, further comprising the step of generating a processed pixel stream that includes the first processed component pixel stream.

14. The method of claim 11, wherein the pixel stream is an RGB pixel stream.

15. The method of claim 11, wherein the pixel stream is a YUV pixel stream.

16. A processing device configured to perform multi-tap filtering, the processing device comprising:
   a memory; and
   a processing unit that includes a configurable multi-tap filter, the configurable multi-tap filter having:
      a parallel-to-serial formatter configured to transform a pixel stream into a first component pixel stream and a second component pixel stream,
      a configurable memory that includes a first channel and a second channel, wherein pixels from the first component pixel stream are stored in the first channel and pixels from the second component pixel stream are stored in the second channel, and
      a multi-tap filter configured to process a component of a pixel from the first channel and a like component of a pixel from the second channel.

17. The processing device of claim 16, wherein the multi-tap filter is further configured to generate at least a first processed component pixel stream associated with the first component pixel stream.

18. The processing device of claim 17, wherein the configurable multi-tap filter further includes a serial-to-parallel formatter configured to receive at least the first processed component pixel stream and generate, in response, a processed pixel stream.

19. The processing device of claim 16, wherein the pixel stream is an RGB pixel stream.

20. The processing device of claim 16, wherein the pixel stream is a YUV pixel stream.

* * * * *